Patented Sept. 1, 1925.

1,552,403

UNITED STATES PATENT OFFICE.

MARCEL LÉVY, OF GENEVA, SWITZERLAND, ASSIGNOR TO "PRODOR" FABRIQUE DE PRODUITS ORGANIQUES S. A., OF GENEVA, SWITZERLAND.

BITUMINOUS CONCRETE AND LIKE COMPOSITION.

No Drawing.  Application filed September 27, 1924.  Serial No. 740,299.

*To all whom it may concern:*

Be it known that I, MARCEL LÉVY, a citizen of the Greek Republic, and residing at 133 Rue Chatelaine, Geneva, Switzerland, have invented certain new and useful Improvements in and Relating to Bituminous Concrete and like Compositions, of which the following is a specification.

This invention relates to concrete or like compositions made under the action of heat as distinct from cement and like aqueous concretes but having mechanical properties similar to cement concrete and retaining these properties under temperature conditions of use as distinct from plastic mastic compositions.

The invention in brief consists in a process for the manufacture of bituminous concretes which comprises the incorporation of a graded mineral or like aggregate with a naturally occurring bitumen used in a suitably hard form, the words "hard form" in this specification and claim meaning that the naturally occurring bitumen is not to be softened or cut by the addition of oil or a flux, which softening is commonly used when a mastic to replace an asphalt is required. Such mixture of bitumen and oil is quite unsuitable for purposes of the present invention.

In carrying the invention into effect in one form by way of example applied to the manufacture of an acid resisting vat or the lining for an acid resisting vat, a composition is made of the following materials in substantially the proportions specified:—

| | Parts. |
|---|---|
| Gilsonite | 100 |
| Acid resisting powder passing a sieve not coarser than about 600 meshes to the square centimetre | 250–375 |
| Washed river sand passing a sieve having between about 4 to 100 meshes to the square centimetre | 250–500 |
| Acid resisting broken stone of size from 3 to 15 mms. approximate diameter | 250–500 |

These proportions I recommend but they may be varied and simple tests will serve to show if any desired mixture is or is not suitable.

The materials are suitably incorporated preferably under the action of heat, for example about 200–250° C., the powder being first incorporated with the melted gilsonite or all filling materials mixed in at the same time.

Bituminous compositions of the character dealt with herein when large surfaces come into question have a tendency to crack under comparatively large temperature changes unless means are taken to prevent this. This is particularly the case when vats or other articles of very large dimensions or irregular shape have to be made; when vats or other articles are submitted to very sudden or large variations of temperature.

To avoid this either expansion joints or reinforcements are required or both.

The jointing material is preferably an asphalt or bituminous mastic, but rubber, asbestos or any other resistant resilient material may be used.

In building tanks to hold boiling water in my opinion the panels should not be more than 1 to 1½ metres long.

Tanks may be lined with the new concrete instead of being entirely built therefrom. In this case the construction broadly speaking is that of an outer container formed of metal, wood, cement concrete or any other suitable material and a substantially separate inner container made of the new concrete. This inner container should be free to expand or contract within the outer container as far as may be necessary having regard to such expansion joints or reinforcement as may be employed in its construction and to the temperature changes to which it may be subjected.

For large tank linings broken stones up to about 25 mms. may conveniently be used or if the lining be thick up to 35 or 50 mms.

For the lining of large vats I have found it well to leave spaces of from 5 to 25 mms. at intervals of, say 1½ metres, these being filled in with a plastic composition, such as asphalt.

In the case of a digester 5 metres diameter by 7 metres high, I have used stones of the size of 15 mms. at the sides but on the top where the risk of cracking is greater, I have employed stones up to 30 to 35 mms.

The invention may be employed in connection with road work in which case similar remarks as to expansion apply as with tanks and the like.

If the ground on which the bituminous concrete surface is to be laid permits the pitch concrete to slip easily, for example if the ground be covered with gravel or sand, then the expansion joints may be wider apart, say from 5 to 15 metres or more. The point to bear in mind is that any expansion either of the surface or of the substrata may be freely taken up.

In general, the greater the quantity of mineral matter contained in the concrete and the less pitch, the wider apart may the expansion joints be placed.

Generally, that is in the manufacture of tanks, linings, roadways or other constructions, the aim in all the compositions should be to produce a mixture with as little binder as possible, as large particles of stone as possible and the minimum of voids in the aggregate.

In all cases it is preferable to choose such minerals for the aggregate as are not porous and in the manufacture of tanks or the like regard must be paid to the use to which the tank is to be put so that an acid resisting aggregate will be chosen for a tank required to contain acids.

As regards the broken stones or like large mineral matter, this may be employed up to 75 mms. or even larger.

The greater the risk of cracking the larger the size stones that should be employed.

Having now described my invention what I claim as new and desire to secure by Letters Patent is:—

A concrete composition for the manufacture of acid resisting tanks prepared under the action of heat from the following materials in substantially the proportions specified:—

| | Parts. |
|---|---|
| Gilsonite | 100 |
| Acid resisting powder passing a sieve not coarser than about 600 meshes to the square centimetre | 250–375 |
| Washed river sand passing a sieve having between 4 to 100 meshes to the square centimetre | 250–500 |
| Acid resisting broken stone of size from 3 to 15 mms. approximate diameter | 250–500 |

In testimony whereof I have signed my name to this specification.

MARCEL LÉVY.